United States Patent [19]

Kaplan et al.

[11] Patent Number: 5,924,025
[45] Date of Patent: Jul. 13, 1999

[54] SYSTEM AND METHOD FOR DETECTION OF REDIAL FRAUD IN A CELLULAR TELEPHONE SYSTEM

[75] Inventors: Dmitry Kaplan, Bellevue; Chetan Sharma, Mountlake Terrace; Randy McKernan, Graton, all of Wash.

[73] Assignee: Cellular Technical Services Company, Inc., Seattle, Wash.

[21] Appl. No.: 08/738,264

[22] Filed: Oct. 25, 1996

[51] Int. Cl.$^6$ ........................................... H04M 3/00
[52] U.S. Cl. .................. 455/411; 455/425; 455/435; 455/445; 340/825.31; 340/825.34
[58] Field of Search ..................... 455/410, 411, 455/425, 433, 434, 435, 445; 340/825.31, 825.34

[56] References Cited

U.S. PATENT DOCUMENTS

| | | | |
|---|---|---|---|
| 4,800,387 | 1/1989 | Joy | 342/165 |
| 4,843,562 | 6/1989 | Kenyon et al. | 364/487 |
| 4,955,049 | 9/1990 | Ghisler | 379/58 |
| 5,005,210 | 4/1991 | Ferrell | 455/115 |
| 5,091,942 | 2/1992 | Dent | 380/46 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerihuel et al. | 379/58 |
| 5,309,501 | 5/1994 | Kozik et al. | 379/58 |
| 5,315,636 | 5/1994 | Patel | 379/58 |
| 5,319,699 | 6/1994 | Kerihuel et al. | 379/58 |
| 5,329,591 | 7/1994 | Magrill | 380/25 |
| 5,335,265 | 8/1994 | Cooper et al. | 379/59 |
| 5,335,278 | 8/1994 | Matchett et al. | 380/23 |
| 5,345,595 | 9/1994 | Johnson et al. | 455/33.1 |
| 5,375,244 | 12/1994 | McNair | 395/725 |
| 5,390,245 | 2/1995 | Dent et al. | 380/23 |
| 5,392,355 | 2/1995 | Khurana et al. | 380/23 |
| 5,392,356 | 2/1995 | Konno et al. | 380/23 |
| 5,406,619 | 4/1995 | Akhteruzzman et al. | 340/825.34 |
| 5,420,908 | 5/1995 | Hodges et al. | 379/58 |
| 5,420,910 | 5/1995 | Rudokas et al. | 379/59 |
| 5,448,760 | 9/1995 | Frederick | 455/56.1 |
| 5,455,863 | 10/1995 | Brown et al. | 380/23 |
| 5,465,387 | 11/1995 | Mukherjee | 455/26.1 |
| 5,467,382 | 11/1995 | Schorman | 379/58 |

(List continued on next page.)

*Primary Examiner*—Willis R. Wolfe
*Assistant Examiner*—Hieu T. Vo
*Attorney, Agent, or Firm*—Seed and Berry LLP

[57] ABSTRACT

A system analyzes telephone calls that have been determined by signature analysis to be fraudulent and stores parameter data associated with the fraudulent cell phone. During subsequent cell phone calls, the system compares the stored parameter data associated with the fraudulent cell phone to corresponding parameters from a subsequent call to determine whether the subsequent call is from the fraudulent cellular telephone. In this manner, the system may reject subsequent cellular telephone calls as fraudulent without the need for time consuming signature analysis. Parameters analyzed by the system can include the time of day of the fraudulent call, the origin from which the fraudulent call was placed, the transmitted identification numbers of the fraudulent telephone, and the destination telephone number of the fraudulent call. The system can analyze one or more of these parameters in combination to determine that the subsequent call is fraudulent.

26 Claims, 7 Drawing Sheets

U.S. PATENT DOCUMENTS

| | | | |
|---|---|---|---|
| 5,488,649 | 1/1996 | Schellinger | 379/62 |
| 5,509,075 | 4/1996 | Grube et al. | 380/23 |
| 5,517,554 | 5/1996 | Mitchell et al. | 379/59 |
| 5,517,555 | 5/1996 | Amadon et al. | 379/59 |
| 5,517,568 | 5/1996 | Grube et al. | 380/23 |
| 5,535,431 | 7/1996 | Grube et al. | 455/54.1 |
| 5,537,474 | 7/1996 | Brown et al. | 380/23 |
| 5,541,977 | 7/1996 | Hodges et al. | 379/58 |
| 5,548,636 | 8/1996 | Bannister et al. | 379/201 |
| 5,551,073 | 8/1996 | Sammarco | 455/89 |
| 5,555,192 | 9/1996 | Grube et al. | 364/514 R |
| 5,555,551 | 9/1996 | Rudokas et al. | 379/59 |
| 5,557,654 | 9/1996 | Mäenpää | 379/58 |
| 5,588,042 | 12/1996 | Comer | 455/433 |
| 5,610,973 | 3/1997 | Comer | 455/432 |
| 5,615,408 | 3/1997 | Johnson et al. | 455/33.1 |
| 5,625,869 | 4/1997 | Ngamatsu et al. | 455/33.1 |
| 5,633,914 | 5/1997 | Rosa | 379/59 |
| 5,655,004 | 8/1997 | Holbrook | 455/411 |
| 5,668,786 | 9/1997 | Falk et al. | 340/825.31 |
| 5,689,563 | 11/1997 | Brown et al. | 455/411 |
| 5,713,072 | 1/1998 | Marth et al. | 455/33.1 |
| 5,715,518 | 2/1998 | Barrere et al. | 455/49.1 |
| 5,737,701 | 4/1998 | Rosenthal et al. | 455/411 |
| 5,748,722 | 5/1998 | Lee | 379/160 |
| 5,748,742 | 5/1998 | Tisdale et al. | 380/49 |
| 5,758,277 | 5/1998 | Hawkes | 455/410 |
| 5,770,846 | 6/1998 | Mos et al. | 235/440 |
| 5,777,558 | 7/1998 | Pennypacker et al. | 340/635 |
| 5,790,645 | 8/1998 | Fawcett et al. | 379/189 |
| 5,805,674 | 9/1998 | Anderson Jr. | 379/93.03 |

SYSTEM AND METHOD FOR DETECTION OF REDIAL FRAUD IN A CELLULAR TELEPHONE SYSTEM

TECHNICAL OF THE FIELD

The present invention relates generally to cellular telephone operation, and, more particularly, to a system and method for the detection of redial fraud in a cellular telephone system.

BACKGROUND OF THE INVENTION

In a communications network, it is often desirable to identify and distinguish one transmitter from other transmitters operating within the network. For example, in the radio telephone industry, a cellular telephone system utilizes an electronic serial number (ESN) and a mobile telephone identification number (MIN) to provide a unique identification for each transmitter. When an individual subscriber or other authorized user of a particular cellular telephone wishes to place a phone call, he dials in a telephone number and presses the "Send" button. In response, his cellular telephone transmits its ESN and MIN to the cellular network so the individual subscriber can be charged for the telephone call.

Unfortunately, unscrupulous individuals illegally operate cellular telephones by counterfeiting the ESN and MIN of a valid subscriber's telephone in order to obtain illegal access to the cellular network without paying for the service. The ESN and MIN of a cellular telephone can be obtained by a counterfeiter electronically monitoring the initial transmission of the telephone, and then programming the detected ESN and MIN into another telephone for illegal use. Thus, the mere transmission of the authentic ESN and MIN is by itself inadequate to protect a cellular telephone system from misuse by counterfeiters. When a cell phone initiates a call, it transmits its ESN and MIN as an identification. While the cell phone is identified by its ESN and MIN, it cannot be considered as an authorized cell phone because it is not known whether the ESN and MIN have been transmitted by the authorized cell phone or a fraudulent cell phone. For purposes of the present description a cell phone identified on the basis of the transmitted ESN and MIN is designated as an unauthenticated cell phone until it is determined to be an authorized cell phone or a fraudulent cell phone.

In an effort to provide additional security, some cellular systems and other wireless services, authenticate mobile units based on the radio frequency (RF) transmission of data by the mobile unit during a call set-up process. Rather than identify the mobile unit by its ESN and MIN alone, the system identifies a cellular telephone by its transmission characteristics. In this manner, the cellular system operator can reject calls from illegitimate cellular telephones even when those cellular telephones transmit valid ESN and MIN numbers. For example, in U.S. Pat. No. 5,005,210 issued to Ferrell on Apr. 2, 1991 ("the Ferrell patent"), a system is described that analyzes certain transmitter characteristics in an effort to identify the transmitter type. The system in the Ferrell patent analyzes the manner in which the modulator makes a transition to the designated carrier frequency. This transient response is used to identify the type of transmitter.

While the Ferrell patent describes one class of transmission characteristics that can be used as a fingerprint, other transmission characteristics are also known in the art. For example, U.S. Pat. No. 5,420,910 issued to Rudokas et al. on May 30, 1995 ("the Rudokas patent"), describes an identifier, such as a radio frequency signature, that can be used to positively identify a valid cellular telephone or a known fraudulent telephone. Other types of signature authentication systems are also known in the art and need not be described herein. These transmission characteristics, from whatever source they are derived, can be processed in different manners to create a "fingerprint" of the individual transmitter. The analogy with fingerprints is used because each transmitter fingerprint is believed to be completely unique. The transmitter fingerprint can be used to determine whether the transmission characteristics of the unauthenticated transmitter match the stored fingerprint of the authorized transmitter corresponding to the transmitted ESN and MIN. In such manner, the fingerprint is used with cellular telephone calls to authenticate the cellular telephone.

Fingerprint authentication systems all require at least one transmission characteristic waveform, known to be generated by the authentic cellular telephone, to be used as a reference waveform for the fingerprint authentication system. Some systems may rely more than one reference waveforms to generate the fingerprint. One drawback of these fingerprint authentication systems is that a substantial amount of data processing time may be required to establish the fingerprint. However, this data processing is not time dependent and may be performed over a period of time.

In contrast, the process of comparing the transmission characteristic of the unauthenticated transmitter with the stored fingerprint must be performed in real-time to effectively deny or terminate fraudulent calls. Some existing cellular telephone systems use analysis techniques that are not real time. If a call is subsequently determined to be fraudulent, the destination telephone number is added to a list of known fraudulent numbers. The cellular telephone system checks the list of known fraudulent numbers to prevent any subsequent telephone calls from being placed to a known fraudulent number.

Real-time analysis techniques are subject to possible attack by fraudulent users who attempt to overload the capabilities of a cellular telephone system and force the acceptance of fraudulent calls. The theory is that the cellular telephone system will be forced to allow calls to be placed without the benefit of real-time fingerprint authentication if the system can be so overloaded that it cannot adequately keep up with the call load. Rather than force customers to wait while calls are authenticated, the overloaded system will have to allow calls to be placed without the fingerprint analysis.

Therefore, it can be appreciated that there is a significant need for a system and method for detection of redial fraud and preventing overloading of a cellular telephone system's processing capabilities. The present invention provides this and other advantages as will be illustrated by the following description and accompanying figures.

SUMMARY OF THE INVENTION

The present invention is embodied in a system and method for the detection of repeat wireless telephone fraud. The system comprises signature analysis means for identifying a particular wireless telephone as fraudulent based on an initial telephone transmission from the fraudulent wireless telephone. If the initial telephone transmission has been identified as fraudulent one or more parameters associated with the fraudulent wireless telephone and the initial telephone transmission are stored in a storage area. A processor receives one or more parameters associated with an unauthenticated wireless telephone placing a call subsequent to the time of the initial telephone transmission. The processor can deny the subsequent call if the one or more parameters associated with the unauthenticated wireless telephone match the stored one or more parameters associated with the fraudulent wireless telephone and the initial telephone transmission.

A number of parameters may be used to deny the subsequent telephone calls. The time of day is one parameter used to deny subsequent calls where the subsequent telephone call is placed within a predetermined period of time from the time of the initial telephone transmission. The identification number transmitted by the fraudulent wireless telephone may also be used as the one or more parameters associated with the fraudulent wireless telephone in the initial telephone transmission. The place of origin of the initial telephone transmission may also be used as the one or more parameters. The initial telephone transmission may include destination data associated with an intended recipient of the initial telephone call. The destination data may also be stored in the storage area as the one or more parameters.

In a cellular telephone system having a plurality of cells, the place of origin may be within one of the plurality of cells with the cell origin being used as the one or more parameters. In a cellular telephone system having at least one cell with a plurality of sectors, the stored place of origin may be one of the plurality of sectors, with the sector origin being stored as the one or more parameters.

In an alternative embodiment the signature analysis means may identify the particular wireless telephone as fraudulent a predetermined number of times based on the predetermined number of telephone transmissions from the fraudulent wireless telephone. In this embodiment, the processor will deny the subsequent telephone call if the one or more parameters associated with the unauthenticated wireless telephone match the stored one or more parameters associated with the fraudulent telephone in the initial telephone transmission only after the signature analysis means identifies the particular wireless telephone as fraudulent the predetermined number of times.

The system may also incorporate one or more parameters in combination. For example, the processor may deny the subsequent telephone call if the identification number transmitted by the unauthenticated telephone matches the stored identification number and the subsequent telephone call is placed within a predetermined period of time from the time of the initial telephone transmission.

DETAILED DESCRIPTION OF THE INVENTION

Figure 1A:
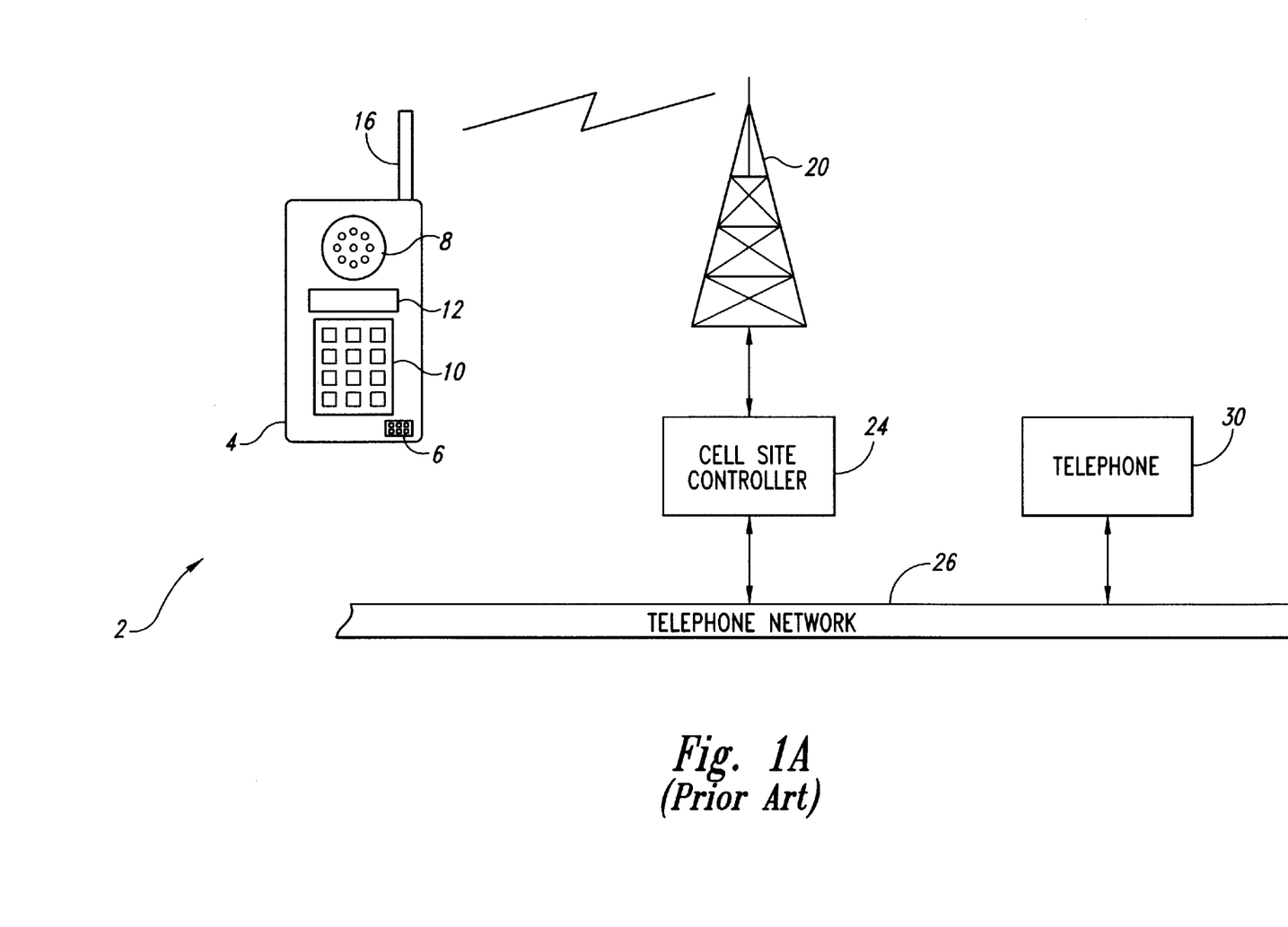
FIG. 1A illustrates the operation of a conventional cellular telephone system.

For a more complete understanding of the present invention, the operation of a wireless telephone system will be briefly discussed. Although the discussion that follows is directed to cellular telephones, it should be clearly understood that the invention can be used with wireless telephone devices that may transmit voice such as cellular telephones or data such as data modems. The term telephone as used herein is intended to include devices for wireless voice and data communication. A conventional cellular telephone system 2 is illustrated in FIG. 1A. An individual cellular telephone ("cell phone") 4 has a microphone 6 and a speaker 8, as well as a keypad 10 and a display 12. The keypad 10 typically includes a redial button 10a that automatically redials the last called number when depressed by the user.

Transmitter and receiver circuits (see FIG. 2) within the cell phone 4 communicate via an antenna 16 to a cell site antenna 20 at a frequency typically in the 800 megahertz (MHz) frequency range. The signal received by the cell site antenna 20 is coupled to a cell site controller 24. The cell site controller 24 determines the authenticity of the ESN and MIN transmitted by the cell phone 4 at the beginning of a cellular telephone call, as well as the telephone number being called by the cell phone 4. The cell site controller 24 couples the cell phone 4 to a conventional telephone network 26. Also coupled to the telephone network 26 is a telephone 30 to which the cell phone 4 is placing a call. In this manner, the cell phone 4 can communicate with the telephone 30. Similarly, the telephone 30 may place a call to the cell phone 4 in the reverse manner described above. The telephone 30 is illustrated in FIG. 1A as connected directly to the telephone network 26. However, those skilled in the art will recognize that the telephone 30 could be another cellular telephone coupled to the cell site controller 24 by the cell site antenna 20, or another cell site controller and antenna (not shown).

Figure 1B:
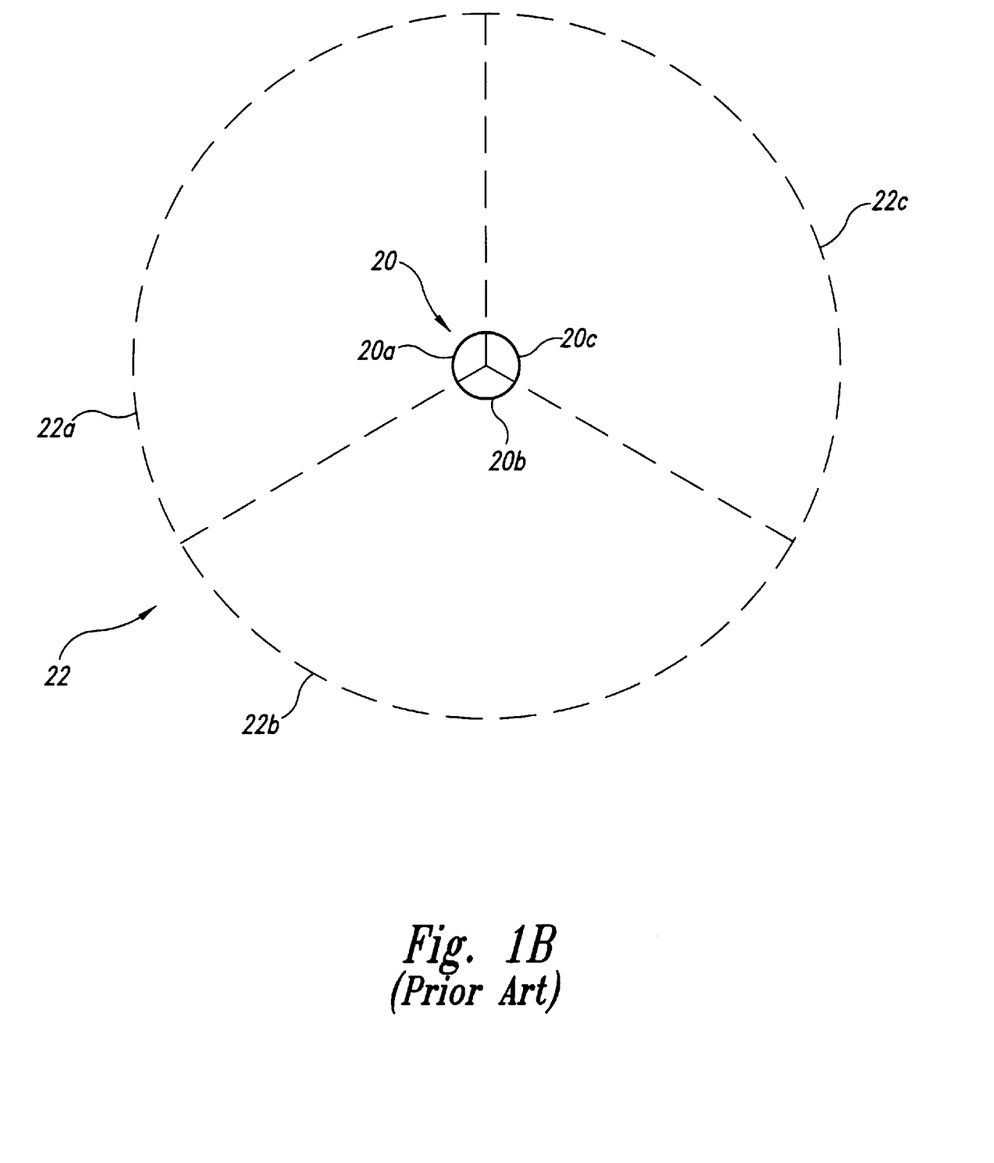
FIG. 1B is a top plan view illustrating sectors of coverage in the convention a cellular telephone system of FIG. 1A.

The antenna 20 has a field of coverage, designated as a cell 22, as shown in FIG. 1B. The antenna 20 is divided into three antenna portions 20a to 20c, with each antenna portion providing coverage over a sector 22a to 22c, respectively, of the cell 22. Those of ordinary skill in the art will recognize that the cell 22 may have more or less sectors than the three sectors 22a to 22c illustrated in FIG. 1B. The cell 22 is illustrated with the antenna 20 located at the center of a substantially circular area of coverage with each sector 22a to 22c being approximately one-third of the cell. However, those of ordinary skill in the art will recognize that actual area of coverage in the sectors 22a to 22c and the cell 22 varies in shape and size depending on many factors such as the location of the antenna, the transmit power of the transmitter (not shown) in the cell, geographic features, and the like.

Figure 2:
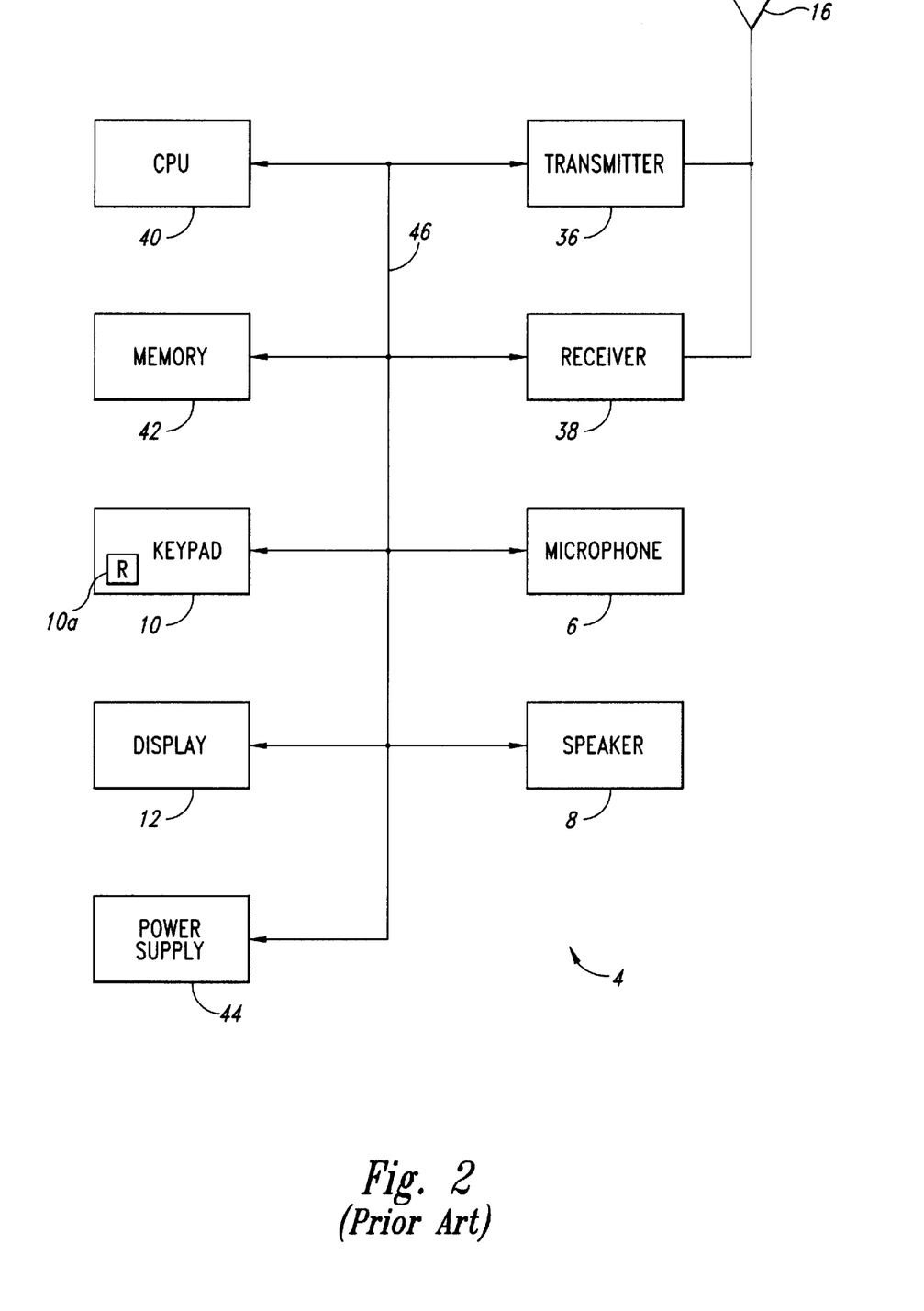
FIG. 2 is a functional block diagram of the conventional cellular telephone of FIG. 1A.

The conventional cell phone 4 is illustrated in the functional block diagram of FIG. 2. The antenna 16 is coupled to a transmitter 36 and a receiver 38. The microphone 6, speaker 8, keypad 10, and display 12 are conventional components that need not be described in any greater detail. The cell phone 4 also includes a central processing unit (CPU) 40, which may be an embedded controller, conventional microprocessor, or the like. In addition, the cell phone 4 includes a memory 42, which may include both random access memory (RAM) and read-only memory (ROM). The cell phone 4 also includes a power supply 44, which includes a battery (not shown) for internal power and a power supply connector (not shown). For the sake of clarity, other conventional components, such as the modulator, demodulator, and local oscillator have been omitted. The various components described above are coupled together by a bus 46. For the sake of clarity, the bus 46 is illustrated as coupling all components together. However, those skilled in the art will recognize that some components, such as the microphone 6 and speaker 8, are analog components while the CPU 40 and memory 42 are digital components. Thus, the bus 46 represents both the analog and digital interconnection of components. The operation of the cell phone 4 is well known in the art and thus will only be described in the context of the present invention.

The cell phone 4 communicates with the cell site controller 24 (see FIG. 1A) using a control channel having a predetermined frequency for the cell site and a voice channel having a frequency designated by the cell site controller 24 for the particular call being placed. Initial communications between the cell phone 4 and the cell site controller 24 occur using only the control channel. The cell phone 4 transmits the stored ESN and MIN for the cell phone to the cell site controller 24 over the control channel. In addition, the dialed telephone number is also transmitted from the cell phone 4 to the cell site controller 24 over the control channel. Digital data using frequency-shift keying (FSK) of 10 Kbaud Manchester-encoded data is transmitted and received over the control channel.

Figure 3:
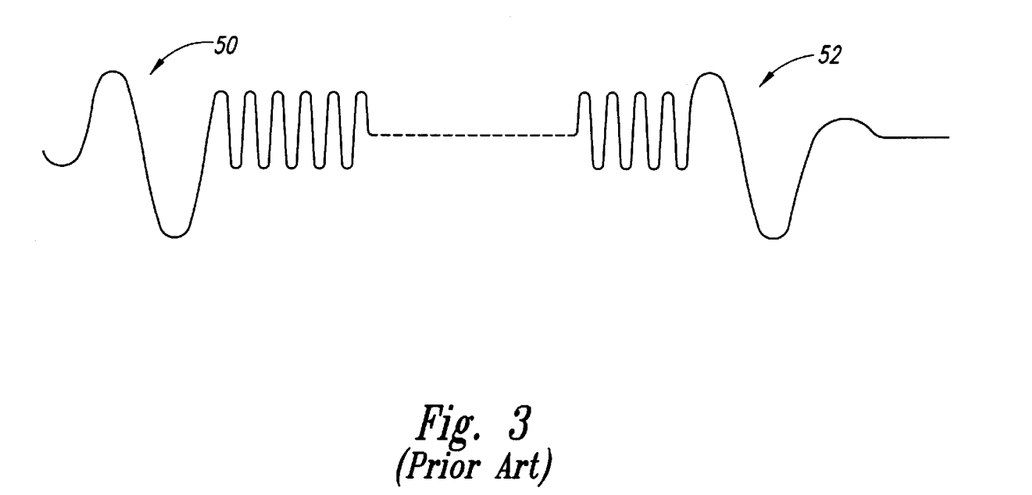
FIG. 3 is a waveform illustrating transmission characteristics of the transmitter of the cellular telephone of FIG. 2.

A typical waveform on the control channel is illustrated in FIG. 3. When the user first presses the "Send" button (not shown) on the keypad 10 (see FIG. 2), the transmitter 36 FSK modulates the data at the predetermined control frequency in the 800 MHz band. When the transmitter 36 is first activated, it must lock onto the appropriate radio frequency (RF) for the particular control channel. The process of locking onto the selected control channel frequency generates a turn-on transient 50. It should be noted that the waveform illustrated in FIG. 3 is not the RF signal itself, but rather an example of the demodulated output received at the cell site controller 24. In addition to the turn-on transient 50, the cell phone 4 generates a turn-off transient 52. The turn-off transient 52 results from the turn-off transient response of the transmitter 36 (see FIG. 2) when transmission on the control channel is complete. The turn-on transient 50 and the turn-off transient 52, which are described in the Ferrell patent, are presented herein merely as examples of the transmission characteristics of an individual cell phone transmitter 36. Alternatively, the cell site controller 24 can analyze other transmission characteristics such as the transient response of the FSK data. Other reference waveforms are illustrated in the Rudokas patent and other references. These reference waveforms, which can be from any source of reference waveforms, are used to generate a fingerprint for the cell phone 4. The fingerprint is subsequently used to determine if the cellular telephone making a call is the authentic cell phone 4, or an illegal/pirate cell phone fraudulently transmitting an authentic ESN and MIN of the cell phone 4 of a valid subscriber.

The transmission characteristics, no matter how derived, are received at the cell site controller 24 and compared with a stored fingerprint for the cell phone 4. One such system for adaptively comparing waveforms is discussed in U.S. Pat. application Ser. No. 08/611,429, entitled "Adaptive Waveform Matching For Use In Transmitter Identification," filed on Mar. 6, 1996 (Express Mail No. TB732548718), which is incorporated herein by reference in its entirety. That system performs a real-time analysis of the transmission characteristic from the unauthenticated transmitter with the stored fingerprint. That system also provides the ability to update the fingerprint and is thus adaptive. A similar transmission characteristic is generated when the cell phone 4 receives a call. In this situation, the cell site controller 24 transmits data to the cell phone 4, which elicits a response from the cell phone. The elicited response includes the transmission characteristic.

However, any real-time analysis system is vulnerable to attack by fraudulent users who attempt to overload the system by flooding it with calls. For example, the fraudulent user can simply press a "Redial" button 10a (see FIG. 2) on the keypad 10 if the call is denied a first time. By repeatedly pressing the Redial button, the fraudulent user can quickly place a call over and over in an attempt to overwhelm the cell site controller 24 and to force acceptance of the call without the real-time fingerprint analysis being conducted.

The present invention is directed to a system and method to detect and prevent redial fraud from overwhelming the cellular telephone system. The present invention minimizes the data processing overhead by eliminating the need for fingerprint analysis each time a call is established between the cell phone 4 and the cell site controller 24. As will be discussed in greater detail below, this includes calls to and from the cell phone 4. If the fingerprint analysis determines that a particular call is fraudulent, the cell location and time are noted. As will be discussed in detail below, subsequent calls to or from that particular cell phone in that particular cell are assumed to be fraudulent and so labeled without the need for an extensive fingerprint analysis. This approach greatly reduces the processing overhead and minimizes the likelihood that the cellular telephone system can be overloaded by redial attempts.

Figure 4:
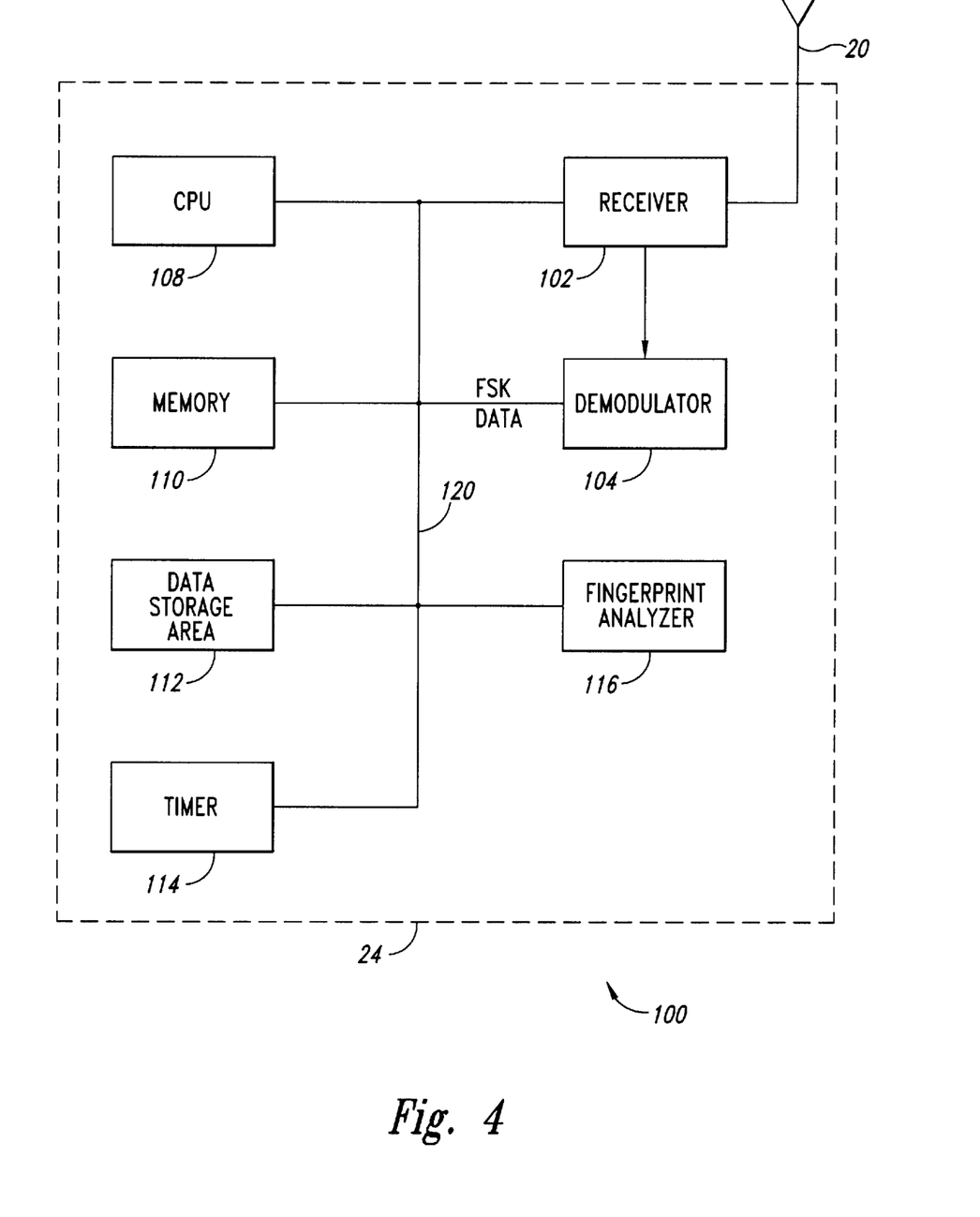
FIG. 4 is a functional block diagram of the system of the present invention.

The present invention is embodied in a system 100 illustrated in the functional block diagram of FIG. 4, and is typically incorporated into the cell site controller 24. The system 100 includes a receiver 102 which is coupled to the antenna 20. The signals received by the receiver 102 are coupled to a demodulator 104 which demodulates the received RF signal and produces FSK data. A central processing unit (CPU) 108 processes the received FSK data. Many of the processes described herein are performed by the CPU 108 using conventional programming techniques. The programming details are well known to those of ordinary skill in the art of computer programming and need not be described herein.

The system 100 also includes a memory 110, which may include both random access memory (RAM) and read-only memory (ROM). A data storage area 112 is used to store data related to a fraudulent cell phone and calls received from the fraudulent cell phone. The data storage area 112 may be part of the memory 110, or a mass storage unit such as a hard disk drive or the like. The operation of the data storage area 112 will be described in detail below. A timer 114 is also used by the system 100 to determine the length of time for which data will be maintained in the data storage area 112.

The system 100 also includes a fingerprint analyzer 116 that performs an initial analysis of a transmission characteristic of the transmitter 36 (see FIG. 2) in the cell phone 4. As discussed above, any acceptable signature analysis technique will operate satisfactorily with the system 100. One example of a signature analysis technique is described in the above-identified U.S. patent application Ser. No. 08/611,429, entitled "Adaptive Waveform Matching for Use in Transmitter Identification." However, the scope of the present invention is not limited by the specific techniques used to perform the analysis of the transmission characteristics. Rather, the present invention is directed to a technique for the analysis of data transmitted from an unauthenticated cell phone in subsequent calls after the fingerprint analyzer 116 has determined that an initial cellular telephone call is fraudulent.

The various components of the system 100 are coupled together by a bus 120, which may carry control signals and power in addition to data. Other components of the cell site controller 24, such as a power supply, transmitter, telephone switching network, and the like are conventional components that form no part of the present invention. For the sake of brevity, those conventional components of the cell site controller 24 are omitted from the present description.

As stated above, the fingerprint analyzer 116 compares the transmission characteristic of the transmitter 36 (see FIG. 2) of the cell phone 4 with the stored fingerprint. This analysis must occur at least one time to determine whether the transmission characteristic is from the authentic cell phone 4 or a fraudulent cell phone. If the fingerprint analyzer 116 determines that the transmitter 36 is fraudulent, the system 100 stores parameter data for various parameter data related to the fraudulent cell phone 4 and fraudulent call. The parameter data may include the time of day, the transmitted ESN and/or MIN of the fraudulent cell phone, the origin of the fraudulent call, and the number of the destination telephone to which the fraudulent call is directed.

In addition, the system 100 can keep track of the number of times that calls have been rejected from a particular cell phone 4 by the fingerprint analyzer 116 within a predetermined period of time. The CPU 108 analyzes corresponding data from a subsequent call to determine if the subsequent call is fraudulent. It should be noted that the analysis of subsequent calls may be performed without the need for a more time-consuming analysis by the fingerprint analyzer 116. If the analysis by the CPU 108 indicates a match between the stored parameters associated with the initial fraudulent call and the parameters associated with the subsequent call, the CPU can deny the subsequent call without any analysis of the fingerprint analyzer 116. As will be discussed below, the CPU 108 may analyze all parameters, or selected parameters taken alone or in combination.

As discussed above, the system 100 must perform a signature analysis at least one time with the fingerprint analyzer 116 (see FIG. 4). If the unauthenticated cell phone is determined to be fraudulent on the basis of analysis by the fingerprint analyzer 116, all subsequent calls can be denied solely on the basis of the stored parameter data associated with the previously denied call. However, there are situations in which the authorized cell phone 4 may be deemed to be fraudulent on the basis of analysis by the fingerprint analyzer 116. For example, the authorized cell phone 4 may be transmitting from an automobile and passing under a bridge or near a source of radio interference. In such situations, the transmission characteristic from the authorized cell phone 4 may not adequately match the stored fingerprint and the call will be denied. The typical response from the user in such situations is to press the redial button 10*a* (see FIG. 4) and try to place the call a second time. If the system denies subsequent calls based on the stored data parameters, subsequent call from the authorized cell phone 4 would be denied by the system 100.

To avoid such inconvenience to the user of the authorized cell phone 4, the system 100 can perform the signature analysis more than one time before denying calls based solely on the stored parameter data. For example, the system 100 can be configured to deny calls as fraudulent three times based on signature analysis by the fingerprint analyzer 116 before denying subsequent calls based solely on the stored parameter data. The system 100 designates a parameter "Y" to indicate the number of times that the system will deny a call using signature analysis by the fingerprint analyzer 116 before denying subsequent calls based solely on the stored parameter data.

Figure 5A:
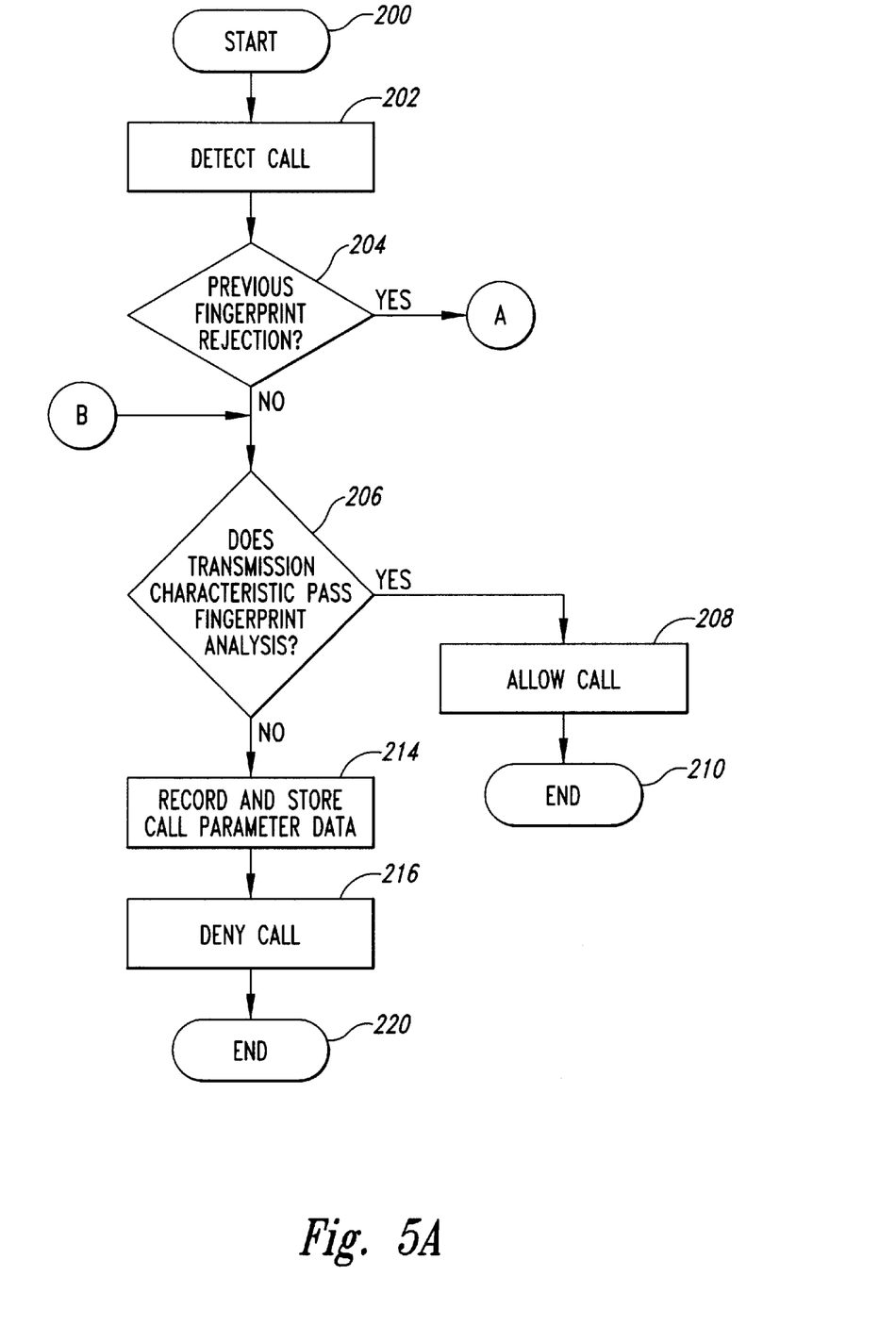
FIGS. 5A and 5B are a flowchart of the operation of the inventive system of FIG. 4.
Figure 5B:
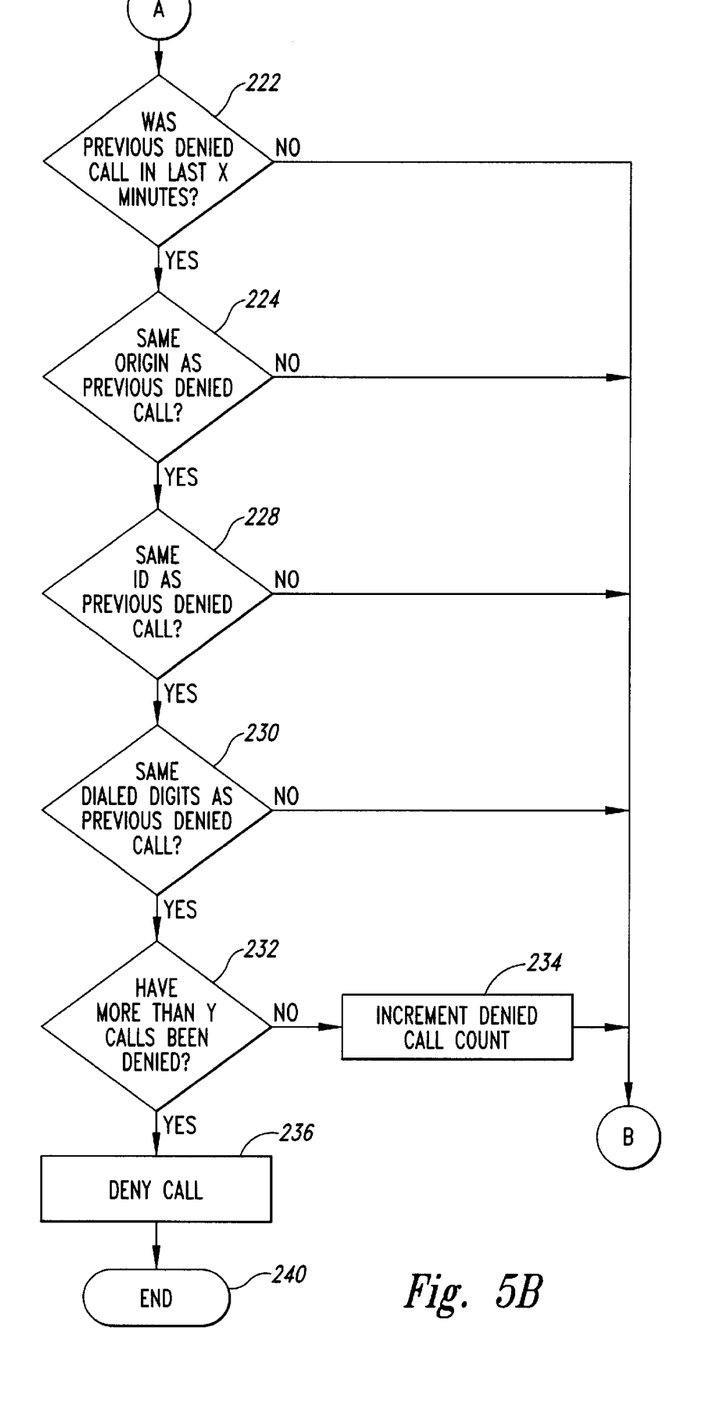

The operation of the system 100 is illustrated in the flowcharts of FIGS. 5A and 5B. The operation begins at a start in step 200. In step 202, the system 100 detects an incoming call from an unauthenticated cell phone. As is known by those of ordinary skill in the art, the transmission from the unauthenticated cell phone includes the transmission of its ESN and MIN. In decision 204, the system 100 determines whether the particular unauthenticated cell phone has recently been denied phone calls based on the analysis by the fingerprint analyzer 116. If the unauthenticated cell phone has not previously been denied by the fingerprint analyzer 116, the result of decision 204 is NO. In that event, the fingerprint analyzer 116 performs an analysis of the transmission characteristic from the unauthenticated cell phone.

In decision 206, the system determines whether the transmission characteristics of the unauthenticated cell phone pass the fingerprint analysis. If the transmission characteristics pass the fingerprint analysis, the result of decision 206 is YES. In that event, the system 100 authenticates the cell phone as an authorized cell phone, allows the call in step 208 and ends the analysis process in step 210. If the transmission characteristics do not pass the fingerprint analysis, the result of decision 206 is NO. In that event, in step 214, the system 100 assumes the cell phone is a fraudulent cell phone and stores parameter data related to the fraudulent cell phone and fraudulent phone call. In a preferred embodiment, the parameter data includes the caller ESN and/or MIN, the dialed digits (i.e., the telephone number called by the fraudulent cell phone), the time of day, and the origin of the fraudulent call. It should be noted there are no dialed digits in the situation where a phone call is placed to the cell phone 4. If the fingerprint analyzer 116 determines that a call is being placed to a fraudulent cell phone, the system 100 stores data parameters as described above, but with no dialed digits. This parameter data is stored in the data storage area 112 for a predetermined period of time, indicated herein as "X" minutes. For example, the system 100 could store the parameter data related to the fraudulent telephone call for a period of 30 minutes. As will be discussed in detail below, the system 100 denies subsequent calls for a period of 30 minutes from any cell phone which matches the stored parameter data, without the need of analysis by the fingerprint analyzer 116. The storage time X may be selected by the operator of the cell site controller 24. The origin of the fraudulent call may be an indication of the cell 22 (see FIG. 1B) from which the fraudulent call originated, or the sector 22*a* to 22*c* from which the fraudulent call originated. Alternatively, the original could be a geographical area, such as a city or county, that includes multiple cells (not shown). The term "origin" is intended to indicate the location from which the fraudulent call was placed to any selected degree of specificity.

In step 216, the system 100 denies the fraudulent call based on the failure of the fingerprint analysis, and ends the analysis in step 220. Thus, a fraudulent call will be initially analyzed by the fingerprint analyzer 116. However, the advantage of the system 100 is that subsequent attempts by the same cell phone to place calls will be detected and blocked without the use of the fingerprint analyzer 116, thus reducing data processing time by the cell site controller 24 and minimizing the risk of system overload by repeated redial attempts. It should be noted that most cell phones include the redial button 10*a* (see FIG. 2) to permit rapid redial of a telephone number. However, the present invention is not limited only to operation of the redial button 10*a*. Rather, any attempt to redial by the fraudulent cell phone, whether by use of the redial button 10*a* or the manual entry of the destination telephone number, is detected by the system 100.

Returning to decision 204 in FIG. 5A, if a call from the same cell phone was previously denied by the fingerprint analyzer 116, the result of decision 204 is YES. In that event, the system 100 determines whether the previous rejection based on the fingerprint analysis occurred in the last X minutes in decision 222, shown in FIG. 5B. If the rejection did not occur within the last X minutes, the result of decision 222 is NO, and the system returns to decision 206 and repeats the fingerprint analysis.

If the fraudulent call was denied within the last X minutes, the result of decision 222 is YES. In that event, in decision 224 the system 100 determines whether the current call is from the same origin as the previous call, which was denied based on the fingerprint analysis. If the present cell phone call is not from the same origin, the result of decision 224 is NO, and the system 100 returns to decision 206 to repeat the fingerprint analysis. If the present cell phone call is from the same origin as the previously denied call, the result of decision 224 is YES. In that event, in decision 228 whether the system 100 determines whether the unauthenticated cell phone is transmitting the same ESN and/or MIN as the previously denied call. If the unauthenticated cell phone making the present call is not transmitting the same ESN and/or MIN, the result of decision 228 is NO and the system returns to decision 206 to repeat the fingerprint analysis.

If the cell phone making the present call is transmitting the same ESN and/or MIN, the result of decision 228 is YES. In that event, the system 100 determines whether the present call is to the same destination as the call previously denied as a fraudulent call. That is, the system determines whether the dialed digits from the current call match the dialed digits from the previously denied call. As discussed above, there are no dialed digits if the call is placed to the fraudulent cell phone. The system 100 performs the same analysis for calls to the fraudulent cell phone as for calls from the cell phone. The only difference is that there is a null value for dialed digits when calls are placed to the fraudulent cell phone. If the present call is not to the same destination as the previously denied call, the result of decision 230 is NO, and the system returns to decision 206 to repeat the fingerprint analysis.

If the present call is to the same destination as the previously denied call, the result of decision 230 is YES. In that event, in decision 232 the system 100 determines whether more than a predetermined number of calls have been denied, indicated here as "Y". As discussed above, the value Y refers to the number of calls which must be denied based on signature analysis by the fingerprint analyzer 116 (see FIG. 4) before being denied by the system 100 based solely on the stored parameter data without processing by the fingerprint analyzer 116. The value Y may be selected by the operator of the cell site controller 24. By selecting a large value for Y, there is less risk of denying a legitimate customer service. For example, if Y is infinite, every call would be analyzed by the fingerprint analyzer 116. If Y has a value of one, the system 100 will deny service to a cell phone that has previously been rejected only one time based on analysis by the fingerprint analyzer 116. This may have the effect of denying service to a legitimate subscriber for X minutes within the particular area of origin. For example, on some occasions a legitimate subscriber has a poor quality transmission that may result in a legitimate call being denied based on signature analysis by the fingerprint analyzer 116. In such an event, the legitimate subscriber would typically press the redial button 10a (see FIG. 4) to try the call again. If the value of Y is selected to be one, that legitimate subscriber would be prevented from placing calls from that origin for a period of X minutes. In the presently preferred embodiment, the value of Y is selected to be three. With a value of three, the system 100 must deny three calls within X minutes based on signature analysis by the fingerprint analyzer before denying subsequent calls based solely on the stored parameter data. This allows legitimate subscribers to redial up to three times in the event of call denials based on signature analysis by the fingerprint analyzer 116, while still having the desired effect of preventing system overload by the use of redial fraud.

In decision 232, if less than Y calls have previously been denied, the result of decision 230 is NO and the system 100 increments a denied call count in step 234 and returns to decision 206 to repeat the fingerprint analysis. The denied call count indicates the number of times that calls have been denied based on signature analysis by the fingerprint analyzer 116 in the last X minutes. If the system has previously rejected more than Y calls to any telephone number, the result of decision 232 is YES. In that event, the system 100 denies the present call in decision 236 and ends the analysis at step 240.

The method described in the flowchart of FIGS. 5A and 5B illustrate many different decision steps that can form part of the analysis of the system 100. However, it should be clearly understood that the decision making sequence illustrated in FIGS. 5A and 5B can be altered and still fall within the scope of the present invention. Furthermore, it is not necessary to include each decision in the process. For example, it is possible to eliminate decision 224, which determines whether the present call is from the same origin as the previously rejected call. This permits the rejection of calls from a fraudulent cell phone that may move from one cell to another or, for example, from sector 22a to sector 22b (see FIG. 1B). The disadvantage of this approach is that the data in the data storage area 112 must be available to cell site controllers at every cell site. The cell site controllers can share data. Alternatively, the data can be stored in a centralized computer (not shown) that is accessible to all cell site controllers.

Alternatively, decision 228, which determines whether the ESN and/or MIN of the present call matches the ESN and/or MIN of the previously rejected call, can be eliminated. The effect of eliminating decision 228 would be that all calls to the same destination from a particular origin would be denied regardless of the transmitted ESN and/or MIN. The advantage of eliminating decision 228 is that it protects the system 100 against attack by fraudulent cell phones that change their ESN/MIN identity on every call. However, there is an increased risk that a legitimate subscriber will not be able to access a commonly used destination, such as a long distance access number, because the fraudulent calls would essentially block legitimate calls for all the cell phones in that origin for a period of X minutes.

Similarly, other subtests illustrated in decisions 222 to 232 may be turned on or off in various combinations to more aggressively block redial fraud. For example, the values of X and Y may be selectively altered to reduce redial fraud. A larger value for X provides longer protection against redial fraud. However, a larger value for X increases the data storage requirements of the data storage area 112 (see FIG. 4). In addition, a larger value for X means that a legitimate subscriber may also be denied service for a longer period of time. For example, if the system 100 rejected a legitimate subscriber for whatever reason, that subscriber would be rejected for X minutes. In the presently preferred embodiment, X is selected to be 10 minutes. Similarly, the adjustment of the value of Y by the operator of the cell site controller 24 is discussed above. It should be clear that the subtests described in decisions 222 to 232 can be enabled or disabled in various combinations as desired by the operator of the cell site controller 24.

The system 100 can also be configured to always accept calls to certain destinations, such as the emergency 911 number. Thus, the present invention provides protection against a specific form of cell phone fraud. While the system 100 includes fingerprint analysis, the present invention itself provides a technique of identifying cell fraud without the need for each unauthenticated transmission to be verified by the fingerprint analyzer 116. This has the effect of reducing data processing time by the cell site controller 24 and minimizing the risk of overload by fraudulent users redialing a telephone number.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the detection of repeat wireless telephone fraud, the system comprising:

signature analysis means for identifying a particular wireless telephone a fraudulent based on an initial telephone transmission from said fraudulent wireless telephone;

a timer to determine a time at which said initial telephone transmission from said fraudulent wireless telephone occurred;

an identification storage area to store an identification number transmitted by said fraudulent wireless telephone;

an origin data storage area to store data related to a place of origin of said initial telephone transmission from said fraudulent wireless telephone;

a destination data storage area to store destination data associated with an intended recipient of said initial telephone transmission from said fraudulent wireless telephone; and a processor to analyze a subsequent telephone call from an unauthenticated wireless telephone, said processor denying said subsequent telephone call if said subsequent telephone call is placed within a predetermined period of time from said time of said initial telephone transmission, if a transmitted identification from said unauthenticated wireless telephone matches said stored identification number, if a place of origin of said subsequent telephone call matches said stored place of origin, and if destination data associated with an intended recipient of said subsequent telephone transmission from said unauthenticated wireless telephone matches said stored destination data.

2. A system for the detection of repeat wireless telephone fraud, the system comprising:

signature analysis means for identifying a particular wireless telephone as fraudulent based on an initial telephone transmission from said fraudulent wireless telephone;

a timer to determine a time at which said initial telephone transmission from said fraudulent wireless telephone occurred;

an identification storage area to store an identification number transmitted by said fraudulent wireless telephone;

an origin data storage area to store data related to a place of origin of said initial telephone transmission from said fraudulent wireless telephone; and a processor to analyze a subsequent telephone communication with an unauthenticated cellular telephone, said processor denying said subsequent communication if said subsequent communication occurs within a predetermined period of time from said time of said initial telephone transmission, if a transmitted identification from said unauthenticated cellular telephone matches said stored identification number, and if a place of origin of said unauthenticated cellular telephone matches said stored place of origin.

3. A system for the detection of repeat wireless telephone fraud, the system comprising:

signature analysis means for identifying a particular wireless telephone as fraudulent based on an initial telephone transmission from said fraudulent wireless telephone;

a storage area to store one or more parameters associated with said fraudulent wireless telephone; and a processor to receive one or more parameters associated with an unauthenticated wireless telephone having a wireless communication subsequent to said initial telephone transmission, said processor denying said subsequent communication if said one or more parameters associated with said unauthenticated wireless telephone match said stored one or more parameters.

4. The system of claim 3 wherein said subsequent communication is a telephone call placed from said unauthenticated wireless telephone.

5. The system of claim 3 wherein said subsequent communication is a telephone call placed to said unauthenticated wireless telephone.

6. The system of claim 3, further including a timer to record a time of said initial telephone transmission as said one or more parameters, said processor denying said subsequent communication occurs within a predetermined period of time from said time of said initial telephone transmission.

7. The system of claim 3 wherein an identification number transmitted by said fraudulent wireless telephone is stored in said storage area as said one or more parameters, said processor denying said subsequent communication if an identification number transmitted by said unauthenticated telephone matches said stored identification number.

8. The system of claim 7, further including a timer to record a time of said initial telephone transmission as an additional one of said one or more parameters, said processor denying said subsequent communication if said identification number transmitted by said unauthenticated telephone matches said stored identification number and if said subsequent communication occurs within a predetermined period of time from said time of said initial telephone transmission.

9. The system of claim 3 wherein data related to a place of origin of said initial telephone transmission from said fraudulent wireless telephone is stored in said storage area as said one or more parameters, said processor denying said subsequent communication if a place of origin of said unauthenticated wireless telephone matches said stored place of origin.

10. The system of claim 9 wherein said subsequent communication is a telephone call from said unauthenticated wireless telephone and destination data associated with an intended recipient of said initial telephone transmission from said fraudulent wireless telephone is stored in said storage area as an additional one of said one or more parameters, said processor denying said subsequent telephone call if said place of origin of said unauthenticated wireless telephone call matches said stored place of origin and destination data associated with an intended recipient of said subsequent telephone call from said unauthenticated telephone matches said stored destination data.

11. The system of claim 9 for use with a wireless telephone system having a plurality of cells, said stored place of origin being one of said plurality of cells, said processor analyzing said subsequent communication to determine if said place of origin of said unauthenticated wireless telephone is said one cell and denying said subsequent communication if said place of origin is said one cell.

12. The system of claim 9 for use with a wireless telephone system having at least one cell with a plurality of sectors, said stored place of origin being one of said plurality of sectors, said processor analyzing said subsequent communication to determine if said place of origin of said unauthenticated wireless telephone is said one sector and denying said subsequent communication if said place of origin is said one sector.

13. The system of claim 3 wherein said subsequent communication is a telephone call from said unauthenticated wireless telephone and destination data associated with an intended recipient of said initial telephone transmission from said fraudulent wireless telephone is stored in said storage area as said one or more parameters, said processor denying said subsequent telephone call if destination data associated with an intended recipient of said subsequent telephone call from said unauthenticated telephone matches said stored destination data.

14. The system of claim 3 wherein said signature analysis means identifies said particular wireless telephone as fraudulent a predetermined number of times based on said predetermined number of telephone transmissions from said fraudulent wireless telephone subsequent to said initial telephone transmission, said processor denying said subsequent communication if said one or more parameters associated with said unauthenticated wireless telephone match said stored one or more parameters only after said signature analysis means identifies said particular wireless telephone as fraudulent said predetermined number of times.

15. A method for the detection of repeat wireless telephone fraud, the method comprising the steps of:
identifying a particular wireless telephone as fraudulent based on signature analysis of an initial telephone transmission from said fraudulent wireless telephone;
storing one or more parameters associated with said fraudulent wireless telephone;
receiving one or more parameters associated with a communication with an unauthenticated wireless telephone subsequent to said initial telephone transmission; and
denying said subsequent communication if said one or more parameters associated with said unauthenticated wireless telephone match said stored one or more parameters.

16. The method of claim 15 wherein said subsequent communication is a telephone call placed from said unauthenticated wireless telephone.

17. The method of claim 15 wherein said subsequent communication is a telephone call placed to said unauthenticated wireless telephone.

18. The method of claim 15, further including the step of recording a time of said initial telephone transmission as said one or more parameters, said step of denying said subsequent communication denying said subsequent communication if occurring within a predetermined period of time from said time of said initial telephone transmission.

19. The method of claim 15 wherein an identification number transmitted by said fraudulent wireless telephone is stored as said one or more parameters, said step of denying said subsequent communication denying said subsequent communication if an identification number transmitted by said unauthenticated telephone matches said stored identification number.

20. The method of claim 19, further including the step of recording a time of said initial telephone transmission as an additional one of said one or more parameters, said step of denying said subsequent communication denying said subsequent communication if said identification number transmitted by said unauthenticated telephone matches said stored identification number and if said subsequent communication occurs within a predetermined period of time from said time of said initial telephone transmission.

21. The method of claim 15 wherein data related to a place of origin of said initial telephone transmission from said fraudulent wireless telephone is stored as said one or more parameters, said step of denying said subsequent communication denying said subsequent communication if a place of origin of said unauthenticated wireless telephone matches said stored place of origin.

22. The method of claim 21 wherein said subsequent communication is a telephone call from said unauthenticated wireless telephone and destination data associated with an intended recipient of said initial telephone transmission from said fraudulent wireless telephone is stored as an additional one of said one or more parameters, said step of denying said subsequent telephone call denying said subsequent telephone call if said place of origin of said subsequent telephone call matches said stored place of origin and destination data associated with an intended recipient of said subsequent telephone call from said unauthenticated telephone matches said stored destination data.

23. The method of claim 21 for use with a wireless telephone system having a plurality of cells, said stored place of origin being one of said plurality of cells, said step of denying said subsequent communication denying said subsequent communication if said place of origin of said unauthenticated wireless telephone is said one cell.

24. The method of claim 21 for use with a wireless telephone system having at least one cell with a plurality of sectors, said stored place of origin being one of said plurality of sectors, said step of denying said subsequent communication denying said subsequent communication if said place of origin of said unauthenticated wireless telephone is said one sector.

25. The method of claim 15 wherein said subsequent communication is a telephone call from said unauthenticated wireless telephone and destination data associated with an intended recipient of said initial telephone transmission from said fraudulent wireless telephone is stored as said one or more parameters, said step of denying said subsequent telephone call denying said subsequent telephone call if destination data associated with an intended recipient of said subsequent telephone call from said unauthenticated telephone matches said stored destination data.

26. The method of claim 15 wherein said step of identifying identifies said particular wireless telephone as fraudulent a predetermined number of times based on said predetermined number of telephone transmissions from said fraudulent wireless telephone subsequent to said initial telephone transmission, said step of denying said subsequent communication denying said subsequent communication if said one or more parameters associated with said unauthenticated wireless telephone match said stored one or more parameters only after said step of identifying identifies said particular wireless telephone as fraudulent said predetermined number of times.

* * * * *